(12) United States Patent
Sotak et al.

(10) Patent No.: US 6,801,661 B1
(45) Date of Patent: Oct. 5, 2004

(54) METHOD AND SYSTEM FOR ARCHIVAL AND RETRIEVAL OF IMAGES BASED ON THE SHAPE PROPERTIES OF IDENTIFIED SEGMENTS

(75) Inventors: George E. Sotak, Mendon, NY (US); Rajiv Mehrotra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 619 days.

(21) Appl. No.: 09/784,744

(22) Filed: Feb. 15, 2001

(51) Int. Cl.[7] ................................................ G06K 9/46
(52) U.S. Cl. ....................... 382/203; 382/220; 382/280; 382/308
(58) Field of Search ................................. 382/280, 224, 382/190, 195, 199, 261, 308, 276, 103, 203, 209, 141, 100, 305, 220; 348/86, 91

(56) References Cited

U.S. PATENT DOCUMENTS

| | | | |
|---|---|---|---|
| 5,418,895 A | 5/1995 | Lee | 395/131 |
| 5,579,471 A | 11/1996 | Barber et al. | 395/326 |
| 5,852,823 A | 12/1998 | De Bonet | 707/6 |
| 5,926,568 A | * 7/1999 | Chaney et al. | 382/217 |
| 6,549,660 B1 | * 4/2003 | Lipson et al. | 382/224 |

FOREIGN PATENT DOCUMENTS

| | | | |
|---|---|---|---|
| EP | 0 872803 | 10/1998 | G06F/17/30 |
| WO | WO 9852119 | 11/1998 | G06F/17/30 |

OTHER PUBLICATIONS

W.Y. Ma, "Netra: A Toolbox for Navigating Large Image Databases", Ph.D. Thesis, Dept. of Electrical and Computer Engineering, University of California, Santa Barbara, 1997.

"Similar Shape Retrieval Using Structural Feature Index" by J.W. Gary, Rajiv Mehrotra, Information Systems, vol. 18, No. 7, 525–537, 1993.

A. Pentland, R.W. Picard, S. Schlaroff, "Photobook: Tools for Content–Based Manipulation of Image Databases," SPIE, vol. 2185, 34–47.

"Modal Matching for Correspondence and Recognition" by S. Sclaroff, A. Pentland, M.I.T. Media Laboratory Perceptual Computing Section Technical Report No. 201, 1993.

"Deformable Prototypes for Encoding Shape Categories in Image Databases" by S. Sclaroff. Pattern Recognition, vol. 30, No. 4, pp. 627–641, 1997.

"A Content–based Image Retrieval System" by C. Huang, D. Huang, Image and Vision Computing, vol. 16, pp. 149–163, 1993.

"Retrieving Image by 2D Shape: A Comparison of Computation Methods with Human Perceptual Judgment" by B. Scassellati, S. Alexopoulos, M. Flickner, Proc. SPIE Storage and Retrieval for Image and Video Databases II, San Jose, CA, pp. 2–14, 1994.

(List continued on next page.)

Primary Examiner—Yon J. Couso
(74) Attorney, Agent, or Firm—David M. Woods

(57) ABSTRACT

A method for representing an image in terms of the shape properties of its identified segments of interest involves analyzing each segment of interest to automatically identify one or more of its perceptually significant components and then representing each perceptually significant component in terms of its shape properties, e.g., by means of Fourier descriptors. The image segment is then characterized as a composition of the shape properties of its perceptually significant components. By repeating the foregoing steps, the image is represented as a composition of its characterized segments. This technique can then be used to archive and retrieve images based on the shape properties of identified segments.

20 Claims, 6 Drawing Sheets

"Shape–Based Retrieval: A Case Study with Trademark Image Databases" by A.K. Jain, A. Vailaya, Pattern Recognition, vol. 31, No. 9, pp. 1369–1390, 1998.

"Parts of Recognition" by D.D. Hoffman and W.A. Richards, Cognition, vol. 18, pp. 65–96, 1985.

"Parts of Visual Objects: An Experimental Test of the Minima Rule" by M.L. Braunstein, D.D. Hoffman, A. Saidpour, Perception, vol. 18, pp. 817–826, 1989.

"Fundamentals of Digital Image Processing" by A.K. Jain, Prentice–Hall: 1989, pp. 362–375.

"Parts of Visual Form: Computational Aspects" by K. Siddiqi, B.B. Kimia, IEEE PAMI, vol. 17, pp. 239–251, 1995.

"Neighborhoods for Distance Transformations Using Ordered Propagation" by I. Ragnemalm. CVGIP: Image Understanding, vol. 56, No. 3, pp. 399–409, 1992.

"Fast Erosion and Dilation by Contour Processing and Thresholding of Distance Maps" by I. Ragnemalm. Pattern Recognition Letters, vol. 13, 161–166, 1992.

"The Image Processing Handbook, Second Edition" by J.C. Russ, CRC Press, pp. 526–530, 1995.

"Fourier Processing for Hand Print Character Recognition" by G.H. Granlund, IEEE Transaction on Computers, vol. C–21, pp. 195–201, 1972.

"Robust Morphologically Continuous Fourier Descriptors I: Projection–Generated Descriptors" by E.R. Dougherty, R.P. Loce, International Journal of Pattern Recognition and Artificial Intelligence, vol. 6, No. 5, pp. 873–892, 1992.

"An Efficient Three–Dimensional Aircraft Recognition Algorithm Using Normalized Fourier Descriptors" by T.P. Wallace, P.A. Wintz, CGIP, vol. 13, pp. 99–126, 1980.

"R–Trees: A Dynamic Index Structure for Spatial Searching" by A. Guttman. Proc. ACM–SIGMOD International Conference on Management of Data, Boston, MA, pp. 47–57, 1984.

The k–D–B–Tree: A Search Structure for Large Multidimensional Dynamic Indexes by J. T. Robinson. Proc. ACM–SIGMOD International Conference on Management of Data, Ann Arbor, Michigan, pp. 10–18, 1981.

"HG–Tree: An Index Structure for Multimedia Databases" by G. Cha, C. Chung. Proc. IEEE International Conference on Multimedia Computing and Systems, Hiroshima, Japan, pp. 449–452, 1996.

"The QBIC Project: Querying Images By Content Using Color, Texture, and Shape:" by W. Niblack, R. Barber, W. Equitz, M. Flickner, E. Glasman, D. Petkovic, P. Yanker, C. Faloutsos, G. Taubin. SPIE vol. 1908, 1993, pp. 173–187.

"Robust Morphologically Continuous Fourier Descriptors II: Continuity and Occlusion Analysis" by Edward R. Dougherty and Robert P. Loce. International Journal of Pattern Recognition and Artificial Intelligence, vol. 6, No. 5, World Scientific Publishing Company, 1992, pp. 893–911.

"Similarity Indexing with the SS–Tree" by D. White and R. Jain. Proc. 12th IEEE International Conference on Data Engineering, New Orleans, Louisiana, pp. 516–523, 1996.

"The SR–Tree: An Index Structure for High–Dimensional Nearest Neighbor Queries" by N. Katayama and S. Satoh. Proc. ACM SIGMOD International Conference on Management of Data, Tucson, Arizona, pp. 13–15, 1997.

* cited by examiner 1.05023

1.15253

1.04972

METHOD AND SYSTEM FOR ARCHIVAL AND RETRIEVAL OF IMAGES BASED ON THE SHAPE PROPERTIES OF IDENTIFIED SEGMENTS

FIELD OF THE INVENTION

The invention relates generally to the field of digital image processing, and in particular to digital image processing techniques relating to the identification and representation of shape components of an image.

BACKGROUND OF THE INVENTION

Rapid advances in digital imaging are leading to an explosion of large collections of digital images. Once digital imaging truly takes hold in the home consumer market, practically every household will have a collection a digital images. If tradition holds, most of these collections (being archived to tape or CDROM) will end up, e.g., stored in a shoebox on a closet shelf, rarely, if ever, to be viewed again. However, digital imaging offers the ability to prevent this outcome in ways never possible with analog imaging. For example, computer applications can be created to assist in the formation of album pages, story telling, photoquilts, etc. The success of these applications depends on the ease by which consumers can access their images. If they have to randomly look through the collection of digital images, or worse yet, through the index prints on the CD case containing the digital image CDs, for the images they want, then they will quickly throw up their hands in frustration and never use the collection again. However, if a computer was to automatically organize their images, based on each image's content, then retrieval would be simple, fast and effective.

The underlying technology that will be common across all these applications combines the tools of digital image processing with those of database management. The digital image processing tools extract information from the image that provides a compact representation of an image's content. The database management tools provide organizational structures for fast, effective retrieval of images based on their extracted content representation. Currently known database technologies are disclosed in International Application No. WO 9,852,119 ("Feature and Region Based Method for Database Image Retrieval"—which involves classifying images by features and region parameters, and searching a database for images within some threshold of the request), European Patent No. 872,803 ("Image Processing Apparatus for Managing Image Data") and U.S. Pat. No. 5,852,823 ("Image Classification and Retrieval System Using a Query-by-Example Paradigm"). Current technologies for image content extraction and representation allow for content characterization in terms of low level features: global color, color composition, texture, and shape. The present invention addresses the issue of shape-based image content representation, organization and retrieval. None of the above-cited database references address the issue of shape.

In general, the definition for the task of shape-based image retrieval is as follows:

Given a query image, retrieve images within the database whose regions have a shape similar to those of the query.

There are three significant issues that must be addressed when developing a shape-based retrieval method:

Shape Representation: encoding the shape information in a form useful for organization, similarity determination, and efficient storage and retrieval.

Similarity Measure: producing results that are consistent with human visual perception. This measure is highly dependent upon the shape representation.

Index Structure: providing the organizational capabilities of the representation for efficient retrieval. The type of index depends upon the shape representation being used.

Existing solutions to the problem of image retrieval based on shape have addressed these issues in different ways. NETRA (W.Y. Ma, "Netra: A Toolbox for Navigating Large Image Databases," Ph.D. Thesis, Dept. of Electrical and Computer Engineering, University of California, Santa Barbara, 1997) uses Fourier Descriptors as the shape representation. As is well known, Fourier Descriptors are not invariant to scale, translation, rotation and starting point, and therefore, must be normalized. In NETRA, the rotation and starting point normalization is achieved by throwing away the phase information (rotation and starting point only affect the phase). Scale invariance is achieved by dividing the magnitudes by the magnitude of the lowest frequency component. The Euclidean distance metric is used to measure the similarity of the normalized magnitudes. NETRA does not address the issue of indexing.

In the article "Similar Shape Retrieval Using Structural Feature Index" (J. E. Gary, R. Mehrotra, *Information Systems*, Vol. 18, No. 7, 525–537, 1993), the shape is represented as the structural components of the shape's boundary. The structural components are normalized and organized in a point access method index. Similarity is determined through a correspondence measure between the query structural component and the component retrieved through an index search.

The general approach used in Photobook (A. Pentland, R. W. Picard, S. Sclaroff, "Photobook: Tools for Content-Based Manipulation of Image Databases," *SPIE*, Vol. 2185, 34–47) is identified as semantics-preserving image compression, i.e., compact representations that preserve essential image similarities. Their choice for shape is the Finite Element Method models of objects described in the article "Modal Matching for Correspondence and Recognition" (S. Sclaroff, A. Pentland, *M.I.T. Media Laboratory Perceptual Computing Section Technical Report No.* 201, 1993). The representation is modes of free vibration of the finite element model of the selected feature points of the shape. Similarity is measured in terms of the deformation energy required to match the query shape to the database shape. Subsequent work developed a method for organizing the representations (S. Sclaroff, "Deformable Prototypes for Encoding Shape Categories in Image Databases," *Pattern Recognition*, Vol. 30, No. 4, 627–641, 1997).

In the article "A Content-based Image Retrieval System" (C. Huang, D. Huang, *Image and Vision Computing*, Vol. 16, 149–163, 1993), the shape description comprises moments and Fourier Descriptors of the shape's boundary and feature points (unction and curvature) to capture internal structure. Retrieval is done in two phases. First, the moments and Fourier Descriptors of the query shape's boundary is compared using a city block distance measure to every image in the database and the top twenty candidates are chosen. Final similarity is determined through a complex hash table of the feature points.

The QBIC system (which is described in U.S. Pat. No. 5,579,471) initially represented shape through a combination of heuristic features such as area, circularity, eccentricity, major axis orientation, and a set of algebraic moment invariants. Similarity is judged through the Euclidean distance metric. As discussed in U.S. Pat. No. 5,579,471, similar heuristic features and moments do not guarantee perceptually similar shapes. More sophisticated shape descriptors were explored in the article "Retrieving Image by 2D Shape: A Comparison of Computation Methods with Human Perceptual Judgments," (B. Scassellati, S. Alexopoulos, M. Flickner, Proc. *SPIE Storage and Retrieval for Image and Video Databases II,* San Jose, Calif., 2–14, 1994), such as parametric curve distance, turning angle, sign of curvature, and a modified Hausdorf distance, with no decisive result.

In the article "Shape-Based Retrieval: A Case Study with Trademark Image Databases," (A. K. Jain, A. Vailaya, *Pattern Recognition,* Vol. 31, No. 9, 1369–1390, 1998), the retrieval process comprises two phases with a different shape representation in each phase. In the first phase, "fast pruning", the shape representation comprises edge angles (a histogram of edge directions) and moment invariants. This representation of the query shape is compared against all images in the database in order to retrieve the top ten candidates to pass on to the next phase. The second phase improves the similarity ranking by employing deformable templates. Again, they reported difficulty agreeing with human subjective results.

In the article "Parts of Recognition" (D. D. Hoffmnan, W. A. Richards, *Cognition,* Vol. 18, 65–96, 1985), Hoffmnan and Richards advocated that shape decomposition should precede shape description. The challenge here is to insure that the decomposition scheme is invariant under rigid transformations, robust to local deformations, stable under global transformations, and produces components consistent with human perception. Their formulation leads to a boundary-based decomposition scheme that divides a plane curve into segments at negative curvature minima. They further developed this concept into a full representation scheme they referred to as codons: boundary segments that are bounded by negative curvature minima, described by curvature maxima and zeros, and subsequently classified into one of six possible types. In the article "Parts of Visual Objects: An Experimental Test of the Minima Rule" (M. L. Braunstein, D. D. Hoffman, A. Saidpour, *Perception,* Vol. 18, 817–826, 1989), Braunstein et al. present psychophysical evidence supporting the concepts behind codons. In the article "Parts of Visual Form: Computational Aspects" (K. Siddiqi, B. B. Kimia, *IEEE PAMI,* Vol. 17, 239–251, 1995), Siddiqi and Kimia point out many situations for which codons fail. They argue that this is due to the method being limited to analyzing only the boundary and, therefore, ignoring the interior of the shape. Instead, they propose a scheme, motivated by the general principle of "form from function", that decomposes the shape into neck-based and limb-based components. They show that this decomposition scheme is robust under rigid and local deformations, and stable under minor global transformations. Their experiments on test shapes with human generated ground truth demonstrate the ability of the neck-limb based decomposition scheme to mimic a human's perception of the shape's components.

SUMMARY OF THE INVENTION

An object of the invention is the retrieval of images containing regions with shape characteristics similar to a query shape.

The present invention is directed to overcoming one or more of the problems set forth above. Briefly summarized, according to one aspect of the present invention, A method for representing an image in terms of the shape properties of its identified segments of interest comprises the steps of: (a) providing a digital image with identified segments of interest; (b) analyzing a segment of interest to automatically identify one or more of its perceptually significant components; (c) representing a perceptually significant component in terms of its shape properties, thereby providing a shape representation; (d) characterizing an image segment as a composition of the shape properties of its perceptually significant components, thereby providing a characterized image segment; and (e) repeating steps (b) to (d) to represent the image as a composition of its characterized segments.

The technique presented according to the invention assumes the input to be an image segmented into regions of interest. Each segment of interest is automatically analyzed to identify its perceptually significant components. In this invention, this is accomplished with an adaptive morphological filter that removes perceptually insignificant shape information. The shapes of these components are then characterized, e.g., with normalized Fourier Descriptors, which characterizes the region's shape in terms of the frequency content of its boundary. Since an image segment may have more than one perceptually significant component, the programmatic shape representation of the segment is the composition of the shape representations of each perceptually significant component. Each perceptually significant component of each image segment is stored and indexed for efficient retrieval of candidate shapes in response to a query, e.g., an R-Tree is used to index keys generated from the normalized Fourier Descriptors. The process of determining the similarity of two image segments comprises the comparison of each of the segment's perceptually significant components, e.g., with Fourier Descriptors as the shape characterization scheme, similarity is determined with a Euclidean Distance metric and Fourier Descriptor normalization error compensation.

The advantage of the invention is that it provides a simple, fast and effective method for the archival and retrieval of images based on the shape properties of perceptually significant components of identified segments in an image. The centerpiece and principal advantage of this invention is the automatic identification and representation of perceptually relevant shape components of the identified image segments. The process of comparing segments of two images comprises the determination of the similarity of the perceptually relevant shape components of the segments. These are combined together into a system for retrieving images from a database that contains segments with shape properties similar to those of a query image or sketch. This method will find application in any product wishing to provide image archival and retrieval capabilities where the computer will automatically organize images, based on the image's content.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing shape-based image representation are well known, the present description will be directed in particular to attributes forming part of, or cooperating more directly with, the method and system in accordance with the present invention. Method and system attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1A:
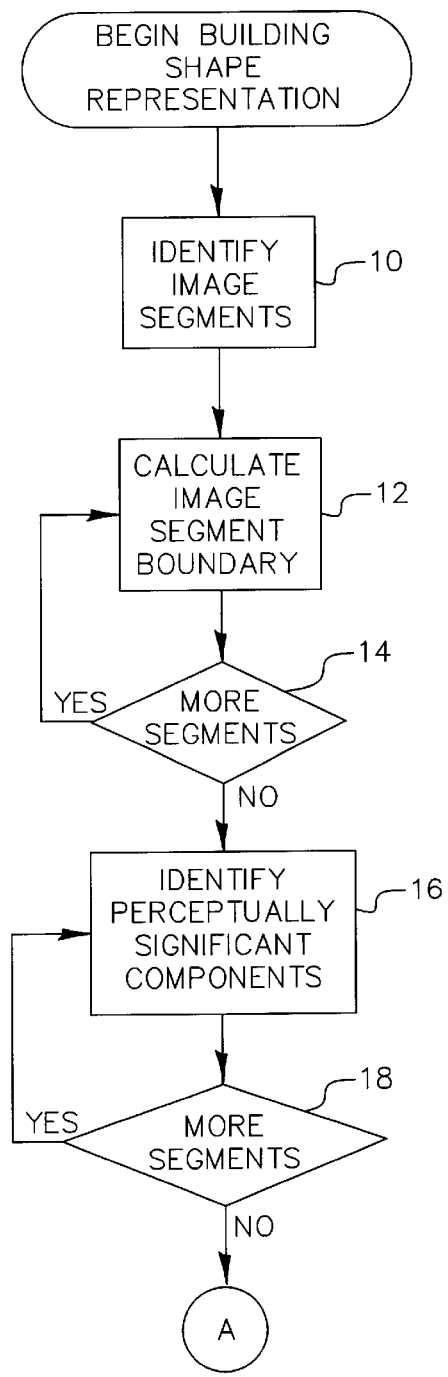
FIGS. 1A and 1B show a method for building a shape representation in accordance with a preferred embodiment of the invention.
Figure 1B:
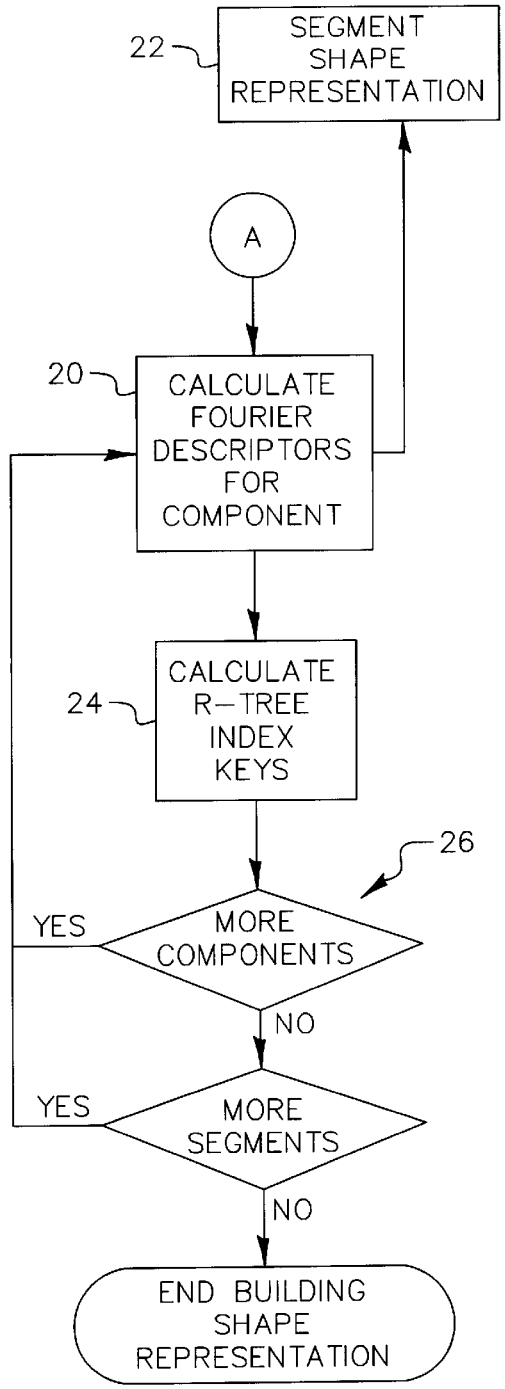

Referring to FIGS. 1A and 1B, the image is first segmented into regions of interest in a segmentation stage 10. The inventive method to be presented can be used to archive and retrieve images based on shape emblems. The method makes no assumptions about and places no restrictions on the segmentation method that generates the image regions to be characterized by shape. Various segmentation algorithms are known in the prior art may be used. For instance, U.S. Pat. No. 5,418,895 (which is incorporated herein by reference) discloses a technique for segmenting a color image into regions corresponding to objects in the physical world. Alternatively, other techniques known to those of ordinary skill may be used.

Given the segmented image, the first step in determining the similarity of images based on perceptually significant shape components is to extract a boundary model of the image segments. Accordingly, a boundary model for each segment is calculated and extracted in a boundary representation stage 12. There are a number of known techniques for the proper representation of segment boundaries, such as x-y coordinate lists, chain codes, and polygonal approximation (see, e.g., A. K. Jain, *Fundamentals of Digital Image Processing,* Prentice-Hall: 1989, pp. 362–375). The boundary model employed in a preferred embodiment of this invention is the list of x-y coordinates. This list is automatically extracted for each image segment by "walking" around the segment's boundary and recording the x,y positional coordinates for each boundary pixel. The walk treats the foreground (the interior of the image segment) as being 8-connected and the background (everything not in the image segment) as being 4-connected. Referring to FIG. 1A, if it is determined (in a query 14) that there are additional segments to process, the process flow is returned to the boundary representation stage 12 until all segments are processed for boundary models.

Given the x,y coordinate boundary model for each image segment, the next step in the process is to decompose the segment into perceptually relevant components in a component identification stage 16. This stage employs a perceptual decomposition method such as the one described in the article "Parts of Visual Form: Computational Aspects" (K. Siddiqi, B. B. Kimia, *IEEE PAMI,* Vol. 17, 239–251, 1995). Then a relevance weight is assigned to each component. The relevance weight in the case of Fourier Descriptors (the shape representation method described below) is the reciprocal of total energy of the component's Fourier Descriptors (calculated as the sum of the square magnitudes of the Fourier Descriptors) times the fractional area contribution of the component to the overall segment area. A solitary circle will have a relevance weight of one, while a line will have a relevance weight less than one (the energy of a pure circle is one, as the shape deviates from a circle, its energy increases, reaching a maximum for a line).

In the case of the preferred embodiment of this invention, the perceptually insignificant components are actually removed from the segment, e.g., in the component identification stage 16, leaving one or more perceptually significant components to be further characterized. Linear filters were found to be ineffective in removing the effects of protrusions/intrusions, which are typical insignificant components. Non-linear filters that can-be created within the framework of mathematical morphology were found to be effective (see, e.g., J. Serra, *Image Analysis and Mathematical Morphology,* Academic Press, 1982). Erosion and dilation are the basic operations of mathematical morphology. In both operations the image is probed by a set referred to as a structuring element. The domain of the structuring element is specified by two attributes: origin and foreground coordinates. The size and shape of the domain determine the effects of the probing for a given morphological operation. The binary erosion of a set X by a structuring element H is the set of points x such that $H_x$ (the translation of H by x) is totally included in X Mathematically, this is expressed as:

$$\epsilon_H(X) \equiv X \ominus H = \{x, H_x \subseteq X\} \qquad (1)$$

The binary dilation of a set X by a structuring element H is the set of points x such that the intersection between X and $H_x$ is not empty. The dilation is mathematically expressed as:

$$\delta_H(X) \equiv X \oplus H = \{x, X \cap H_x \neq \emptyset\} \qquad (2)$$

The simplest morphological filters are the Opening (erosion followed by dilation) and the Closing (dilation followed by erosion). They can be combined into more sophisticated filters: Open-Close and Close-Open. The Opening tends to remove protrusions without affecting intrusions, whereas the Closing tends to fill in intrusions without affecting protrusions. An Opening (Closing) removes protrusions (intrusions) or portions thereof, with widths less than or equal to the structuring element's diameter. Problems are encountered in applying morphological filters in the discrete domain since the "best" representation for the unit circular structuring element is the unit (3×3)

square. The square does not share one important property with the circle: infinite symmetry. This means that the filtering results from the square structuring element will depend on the relative orientation of the shape being filtered. This is not a desirable property of a morphological filter and can be avoided by obtaining a better approximation to the unit circle. This can be achieved by performing the erosion and dilation operations through the use of a Euclidean Distance Map (see I. Ragnemalm "Neighborhoods for Distance Transformations Using Ordered Propagation," *CVGIP: Image Understanding,* Vol. 56, No. 3, 399–409, 1992; and I. Ragnemalm, "Fast Erosion and Dilation by Contour Processing and Thresholding of Distance Maps," *Pattern Recognition Letters,* Vol. 13, 161–166, 1992).

Figure 6A:
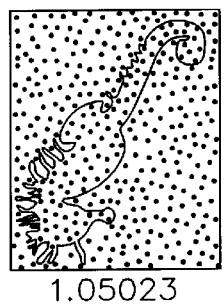
FIGS. 6A, 6B and 6C illustrate the filtering ability of a morphological open-close filter to remove perceptually insignificant components from the boundary model provided from FIGS. 1A and 1B.
Figure 6B:
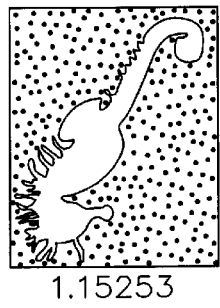
Figure 6C:
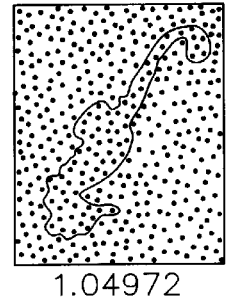

Since both protrusions and intrusions can contribute to the degradation of the shape representation, investigations proceeded with the close-open and open-close morphological filters. The application of these filters with a circular structuring element to a marine shape is illustrated in FIGS. 6A–6C. The center image 6B is the original, the image 6A on the left is the result of the close-open filter, and the image 6C on the right on the right is the result of the open-close filter. The filter size is 5. The number under each image is the corresponding roughness measure. The close-open filter does not achieve the preferred result since the closing operation combines smaller protrusions to make larger ones that are more difficult for the opening to remove. Conversely, the open-close filter does produce the preferred result since the opening first removes the spiky protrusions and the closing follows by filling in some left over intrusions. The perceptually relevant component of the shape is relatively unaffected by the open-close filter, which is due primarily to the better approximation to the circular structuring element provided by the use of the Euclidean Distance Map.

Figure 7A:
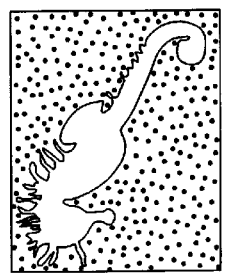
FIGS. 7A, 7B and 7C illustrate the effect that removal of irrelevant information has on the shape representation.
Figure 7B:
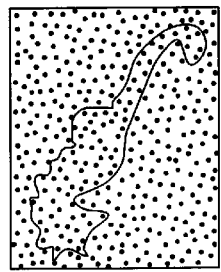
Figure 7C:
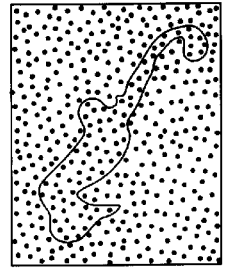

The effect that the removal of this irrelevant information has on the shape description is dramatic, as illustrated in FIGS. 7A–7C. The image 7A on the left is the original. The center image 7B is the reconstruction of the shape using 15 Fourier Descriptor pairs when the irrelevant information is left intact. The image 7C on the right is the same reconstruction after removal of the irrelevant information. As can be observed, the representation of an identical number of Fourier Descriptors with regard to the dominant shape with the irrelevant information removed is much greater than the case with the irrelevant information left intact. This confirms the initial premise the irrelevant information is corrupting the representation of the dominant shape.

Not every shape, however, contains perceptually irrelevant information and, therefore, filtering should not be applied haphazardly to each shape. In addition, shapes that do contain irrelevant information will require different levels of filtering to achieve the desired result. One way to address these two issues is to add adaptive capability to the morphological filter. Achieving this is done through measuring the change in "roughness" of the boundary as the filter is applied. Measuring the roughness is accomplished through a variant of the fractal dimension (see J. C. Russ, *The Image Processing Handbook, Second Edition,* CRC Press, pp. 526–530, 1995). This method defines the fractal dimension to be the slope of the line on a Richardson's plot: stride length vs. perimeter length on a log-log scale.

The Richardson's plot, which is a widely used fractal measurement tool that is described in *The Image Processing Handbook,* can be easily produced from an (x,y) boundary representation by calculating the perimeter length first using every boundary pixel, then every second boundary pixel, repeating up to the nth stride length. The log of the stride length is plotted against the log of the corresponding perimeter length and the slope of the resulting straight line is taken as the fractal dimension. The adaptive morphological filter then consists of measuring the fractal dimension of the original boundary, applying a size 1 open-close filter, and measuring the fractal dimension of the resulting boundary. If the difference between the two measures is greater than some threshold, then a size 2 filter is applied. The resulting boundary's fractal dimension is compared to that of the size 1 filter. If this comparison is greater than the threshold, then repeat the process with the size 3 filter. This process is repeated until either the change in the fractal dimension is less than the threshold or the specified size limit is reached. Excellent results have been achieved applying this adaptive morphological filter with the threshold set to 0.01 and the size limit set to 5. The result of this process is a x,y boundary list of the filtered segment, i.e., the perceptually significant component of the segment.

If the relevance weight that is assigned to each component is based on the component's Fourier Descriptors (as described above), there will need to be input from a subsequent stage (described in detail below) in which the Fourier Descriptors are calculated. Referring to FIG. 1A, if it is determined (in a query 18) that there are additional segments to process for perceptually significant components, the process flow is returned to the component identification stage 16 until all segments are processed to identify perceptually significant components.

Referring now to FIG. 1B, the next step is to construct the actual shape representation of each perceptually significant component. There are several properties that a shape representation scheme should exhibit in order to be robust. First, it should be insensitive to rigid transformations (e.g., translation, rotation, and scale). Second, it should be stable under local transformations (e.g., partial occlusion, component movement, and component distortion). Lastly, the representation should be stable under global transformations (e.g., projective transformations, distortion, and noise). The representation selected and presented below is based on Fourier Descriptors, which after a normalization process are insensitive to rigid transformations. Consequently, Fourier Descriptors are calculated for each perceptually significant component in a Fourier Descriptor representation stage 20 according to the following methodology.

Fourier descriptors are defined to be the coefficients of the Fourier series expansion of a parameterization of the boundary (see A. K. Jain, op cit., pp. 370 –374; and G. H. Granlund, "Fourier Processing for Hand Print Character Recognition," *IEEE Transactions on Computers,* Vol. C-21, 195–201, 1972). The parameterization function maps the boundary into a periodic function as required for Fourier series expansion. The exact definition of the Fourier descriptors is dependent upon the parameterization function. Granlund defines a parameterization function that maps the coordinates of the real plane into the complex plane. The Fourier descriptors converge quickly, allowing rather small feature vectors to discriminate shapes. One disadvantage is that the descriptors from both the negative and positive frequencies must be used, therefore, limiting the gain in efficiency due to the elimination of the discontinuity.

A different approach is advocated in an article by Dougherty and Loce (E. R. Dougherty, R. P. Loce, "Robust Morphologically Continuous Fourier Descriptors I: Projection-Generated Descriptors," *International Journal of Pattern Recognition and Artificial Intelligence,* Vol. 6, No. 5, 873–892, 1992), in which they argue that the Fourier Descriptors defined by direct parameterization of the boundary preserves too much information about the shape, enough for a complete reconstruction, but more than enough for pattern recognition. They claim that a representation that allows for reconstruction is not a requirement of pattern recognition and, therefore, total information preservation is not necessary. Based on this premise, they advocate the use of a projection based parameterization function. The most obvious shape information discarded by the projection operator is intrusions. They use this fact to justify the robustness of their method to occlusion, since, under some circumstances, occlusion will result in the generation of an intrusion on the shape. However, in general, many shapes have intrusions that are a significant contributor to their descriptive information and should not be discarded. Consequently, the present approach, while agreeing with Dougherty and Loce's initial premise concerning pattern recognition requirements, uses another method (Granlund) to calculate Fourier Descriptors.

The parameterization method chosen for the preferred embodiment is that of Granlund (op. cit.). Given a boundary $\beta=\{(x(l),y(l))\forall l;(0\leq l\leq N)\}$ of a region, the parameterization function u(l) is defined as $$u(l)=x(l)+jy(l) \qquad (3)$$

where (x(l), y(l)) is the lth coordinate of the region's boundary and j represents $\sqrt{-1}$. In the continuous case, the definition of the Fourier Descriptors, $\alpha_n$, is:

$$a_n = \frac{1}{L}\int_0^L u(l)e^{-j\frac{2\pi}{L}nl}dl \qquad (4)$$

and the inverse (or reconstruction) is:

$$u(l) = \sum_{n=-\infty}^{\infty} a_n e^{j\frac{2\pi}{L}nl} \qquad (5)$$

Figure 2:
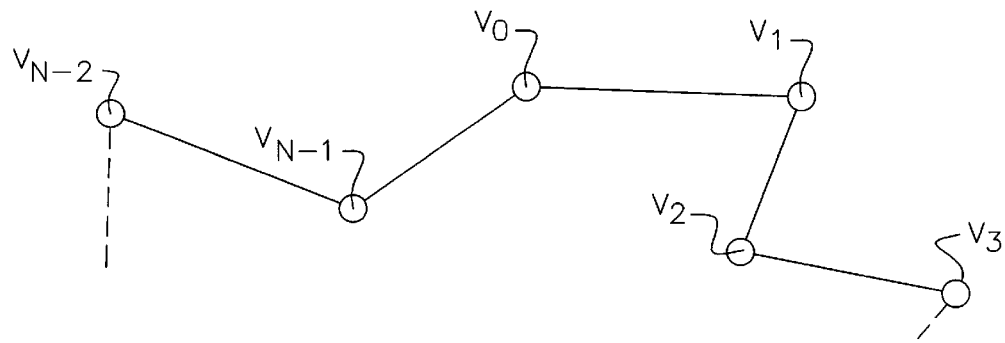
FIG. 2 is an example of an N-point polygonal boundary

The most obvious way to generate a discrete version of Eq. (4) is with the Discrete Fourier Transform (DFT). However, a direct application of the DFT requires the boundary to be interpolated and re-sampled to the desired number of resulting descriptors. In order to avoid this processing step, a discrete formulation of Eq. (4) is obtained for the case where the boundary is a polygonal approximation. An example of an N-point polygonal boundary is illustrated in FIG. 2. The discrete formulation is:

$$a_n = \frac{L}{4\pi^2 n^2}\sum_{k=1}^{N}(b_{k-1}-b_k)e^{-j2\pi n\frac{l_k}{L}} \qquad (6)$$

where, $l_k$ is the boundary's length from the starting point to the kth point $$l_k = \sum_{i=1}^{k}|V_i - V_{i-1}| \qquad (7)$$

and $$b_k = \frac{V_{k+1} - V_k}{|V_{k+1} - V_k|} \qquad (8)$$

and L is the boundary's length defined as $$L = \sum_{k=0}^{N} l_k \qquad (9)$$

Figure 3:
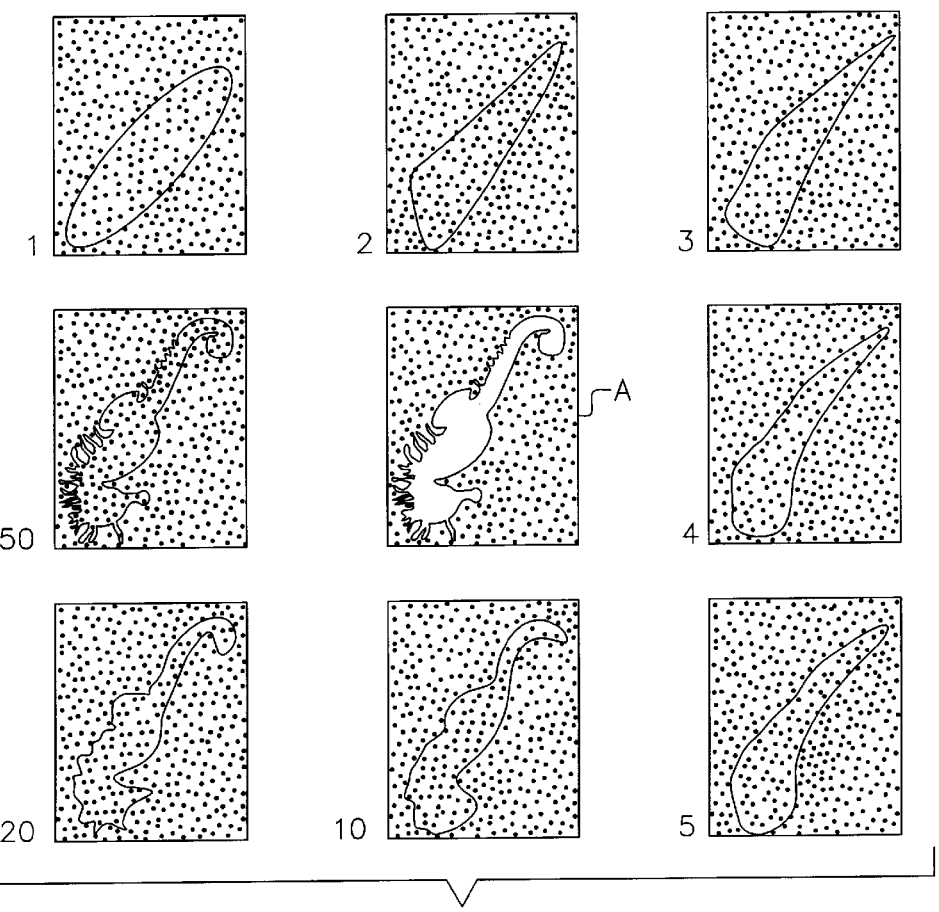
FIG. 3 is an illustration of the reconstruction of a shape (the center shape) from varying numbers of Fourier descriptors.

An example of the application of Eq. (5) and Eq. (6) to the calculation of Fourier Descriptors and the subsequent reconstruction is illustrated in FIG. 3 for a particular marine image shape. More specifically, FIG. 3 shows the effect of reconstructing an approximation of the center shape A from varying number of Fourier Descriptors, where the numbers are illustrated together with the resultant shapes.

As is evident from the above equations, the Fourier Descriptors provide a measure of a shape's frequency content at integer multiples of the fundamental frequency. As pointed out earlier, in order for a shape description to be useful it must be invariant with respect to scale, translation, and rotation. Fourier Descriptors are not invariant to these transforms, in addition they are also not invariant to the boundary's starting point. Therefore, in order for Fourier Descriptors to be useful these dependencies must be removed by, e.g., a normalization procedure. Before describing the normalization procedure, we first note that the Fourier descriptors are complex numbers and they can be represented in polar coordinate form:

$$a_n = A_n e^{j\alpha_n} \qquad (10)$$

where, $A_n$ is the magnitude and $\alpha_n$ is the phase angle of the n-th descriptor.

The normalization procedure used is a slightly modified version of the procedure proposed by Wallace and Wintz (T. P. Wallace, P. A. Wintz, "An Efficient Three-Dimensional Aircraft Recognition Algorithm Using Normalized Fourier Descriptors", *CGIP*, Vol. 13, 99–126, 1980). The translation dependence is eliminated by setting the zero-th descriptor's magnitude and phase equal to zero. To normalize the scale, Wallace and Wintz divide each descriptor's magnitude by the magnitude of the first descriptor, $a_1$, claiming that this descriptor will always have the largest magnitude. However, we have found several cases where this is not true and, therefore, removed this assumption, resulting in the following scale normalization:

$$\|a'_n\| = \frac{\|a_n\|}{\max_n(\|a_n\|)} \qquad (11)$$

i.e., divide each descriptor's magnitude by the largest magnitude of the descriptors. The rotation and starting point normalization is rather difficult since both effect the phase of the descriptors. The phase normalization procedure developed by Wallace and Wintz works well, but required a slight modification to account for our change in the definition of the descriptor with the maximum magnitude. The goal of this procedure is to adjust the phases of all the descriptors such that the phase of the descriptors with the largest and second largest magnitudes is zero. Removing the assumption that the first descriptor is always the largest, results in the following definition for the normalization multiplicity m, $$m=|k-l| \qquad (12)$$

where, k is the index of the descriptor with the second largest magnitude and l is the index of the largest. Wallace and Wintz prove that there are m possible rotation/starting point combinations that result in the required descriptors having zero phase. Therefore, the problem becomes one of finding these m solutions and choosing the "best" one. The first of the m solutions is found by multiplying the descriptors by:

$$e^{j\frac{(n-k)\alpha_l+(l-n)\alpha_k}{k-l}} \tag{13}$$

where, k and l are the indices of the descriptors with the largest and second largest magnitudes, respectively. $\alpha_l$ and $\alpha_k$ are the respective phase angles. If m>1, then subsequent solutions are found by multiplying the descriptors resulting from the application of Eq. (13) by:

$$e^{j\frac{2\pi(n-l)}{|k-l|}} \tag{14}$$

The best solution of the m possible is chosen to be the one that maximizes the "positive real energy", i.e., $$\sum_{n=-NC}^{NC} \text{Re}[a_n]|\text{Re}[a_n]| \tag{15}$$

The normalization process described above does not produce consistent results. For instance, the reconstructions of two similar shapes from normalized Fourier Descriptors do not always agree, sometimes being different, e.g., by a 180 degree rotation and a reflection about the x-axis. In general, the errors in the normalization process can be ascribed to the following:

1. Reflection: $\alpha_n' = -\alpha_n$
2. Rotation: $\alpha_n' = \alpha_n + \pi$
3. Starting Point: $\alpha_n' = \alpha_n + n\pi$
4. Reflection+Rotation: $\alpha_n' = -\alpha_n + \pi$
5. Reflection+Starting Point: $\alpha_n' = -\alpha_n + n\pi$
6. Rotation+Starting Point: $\alpha_n' = \alpha_n + \pi + n\pi$
7. Reflection+Rotation+Starting Point: $\alpha_n' = -\alpha_n + \pi + n\pi$ Since the errors are of predictable quantities, these errors may be compensated for in the similarity measure as described below.

Thoughtful organization of the database can significantly reduce the number of candidates presented to the similarity computation, increasing the efficiency of the retrieval process. The database community has recognized this as a significant issue and has developed technology called indexes (search trees). Indexes not only define an organizing scheme, but also the query (search) predicates. For example, for alphanumeric datatypes, traditional relational database systems employ the $B^+$-Tree which provides a linear ordering of scalar quantities and supports the following query predicates: less than, less than or equal, equal, greater than or equal, and greater than. Modem applications of database technology, such as multimedia, are demanding support for datatypes beyond simple alphanumeric types due to the high dimensionality of the data, i.e., n-dimensional feature vectors. Additionally, these applications are demanding the organization of the feature vectors through a similarity metric as opposed to a linear ordering. This, in turn, demands new search predicates. The database community has responded with the development of new types of indexes, e.g., R-Tree (A. Guttman, "R-Trees: A Dynamic Index Structure for Spatial Searching," Proc. ACM-SIGMOD International Conference on Management of Data, Boston, Mass., 47–57, 1984), k-D-B-Tree (J. T. Robinson, "The k-D-B-Tree: A Search Structure for Large Multidimensional Dynamic Indexes," Proc. ACM-SIGMOD International Conference on Management of Data, Ann Arbor, Mich., 10–18, 1981), HG-Tree (G. Cha, C. Chung, "HG-Tree: An Index Structure for Multimedia Databases," Proc. IEEE International Conference on Multimedia Computing and Systems, Hiroshima, Japan, 449–452, 1996), SS-Tree (D. White, R. Jain, "Similarity Indexing with the SS-Tree," Proc. $12^{th}$ IEEE International Conference on Data Engineering, New Orleans, La., 516–523, 1996), and the SR-Tree (N. Katayama, S. Satoh, "The SR-Tree: An Index Structure for High-Dimensional Nearest Neighbor Queries," Proc. ACM SIGMOD International Conference on Management of Data, Tucson, Ariz., 13–15 (1997).

Shape based image retrieval employing Fourier Descriptors as the shape representation is an example of a modem application with high dimensional data, which happens to be 20 in this particular case (10 positive frequencies and 10 negative). In FIG. 1B, the issue of dimensionality is addressed in an index calculation stage 24 (FIG. 1B) with the R-Tree index, since it is a multi-dimensional index. However, because of the "dimensionality curse," which states that as the dimensionality increases, the efficiency of the search algorithm decreases, the R-Tree is limited to 6–8 dimensions. Therefore, the 20-dimentional Fourier Descriptor feature vector still needs to be reduced in dimensionality by mapping it to a 4-dimensional feature vector. The mapping is accomplished by calculating the energy distribution in four frequency bands, $$E_{A,B} = \sum_{n=-A}^{-B} \|a_n\|^2 + \sum_{n=B}^{A} \|a_n\|^2 \tag{16}$$

with A,B=[10,8], [7,5], [4,3], [2,1]. The resulting 4-dimensional feature vector becomes the key for the R-Tree index and the data associated with the key is a reference to the image segment's shape representation, as stored in a segment shape representation 22. Referring to FIG. 1B, if there are additional components and segments to process for the complete shape representation, a component and segment query stage 26 cycles the process flow to the Fourier Descriptor representation stage 20 until a shape representation is built for all components and segments.

Figure 4:
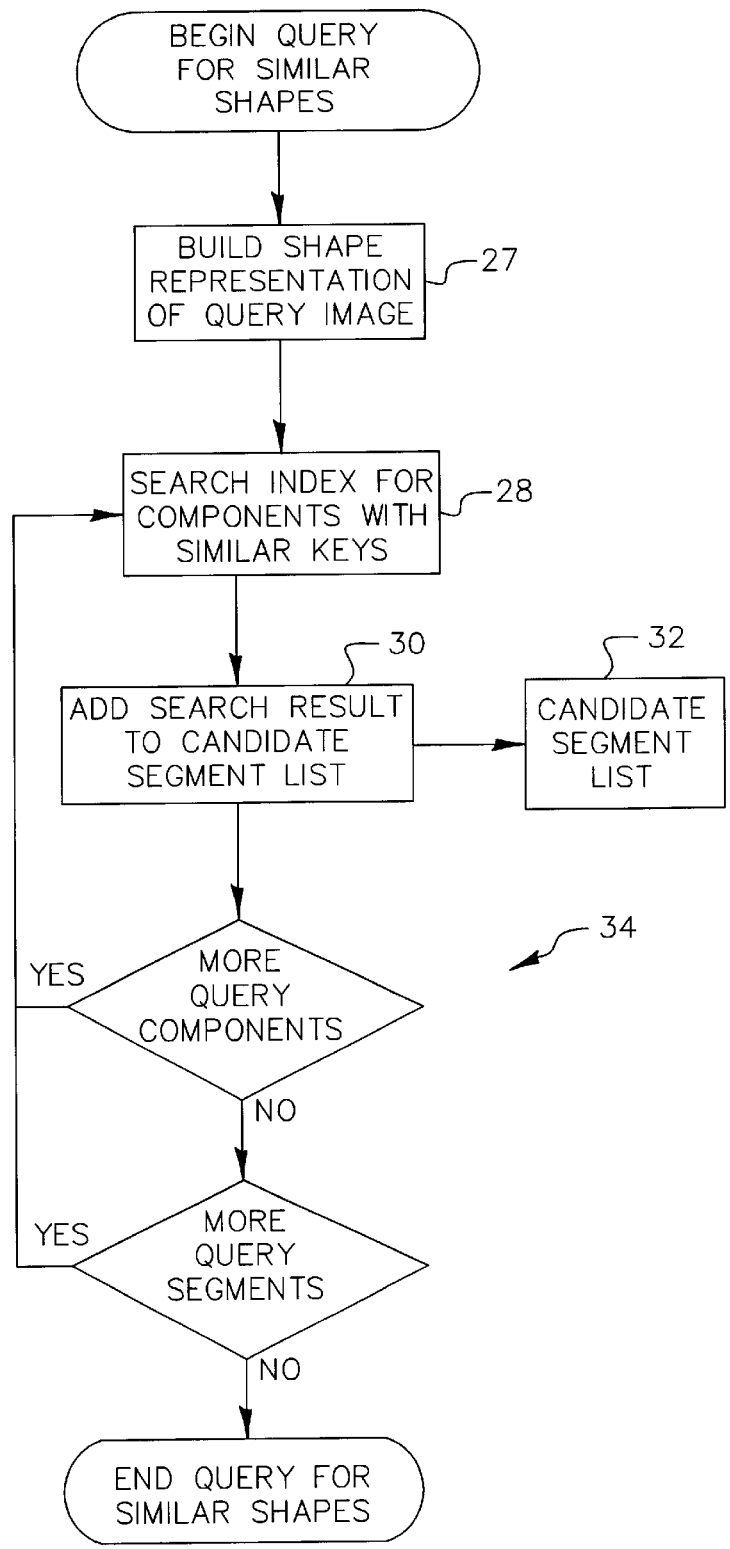
FIG. 4 shows a method for generating a query using the shape representation generated from FIGS. 1A and 1B.

Referring now to FIG. 4, a query of a database for similar shapes begins by building a shape representation 27 of a query image, which is accomplished according to the process and stages explained in connection with FIGS. 1A and 1B. The R-tree index keys calculated in stage 24 (FIG. 1B) are used in a searching stage 28 to search the database index for components with similar keys. When a match is determined, the search result is added in result adder stage 30 to a candidate segment list 32. If further query components and query segments are detected in a query stage 34, the process is returned to the searching stage 30 until the query is completed for all components and segments and the candidate segment list 32 is finished.

Figures 5A, 5B:
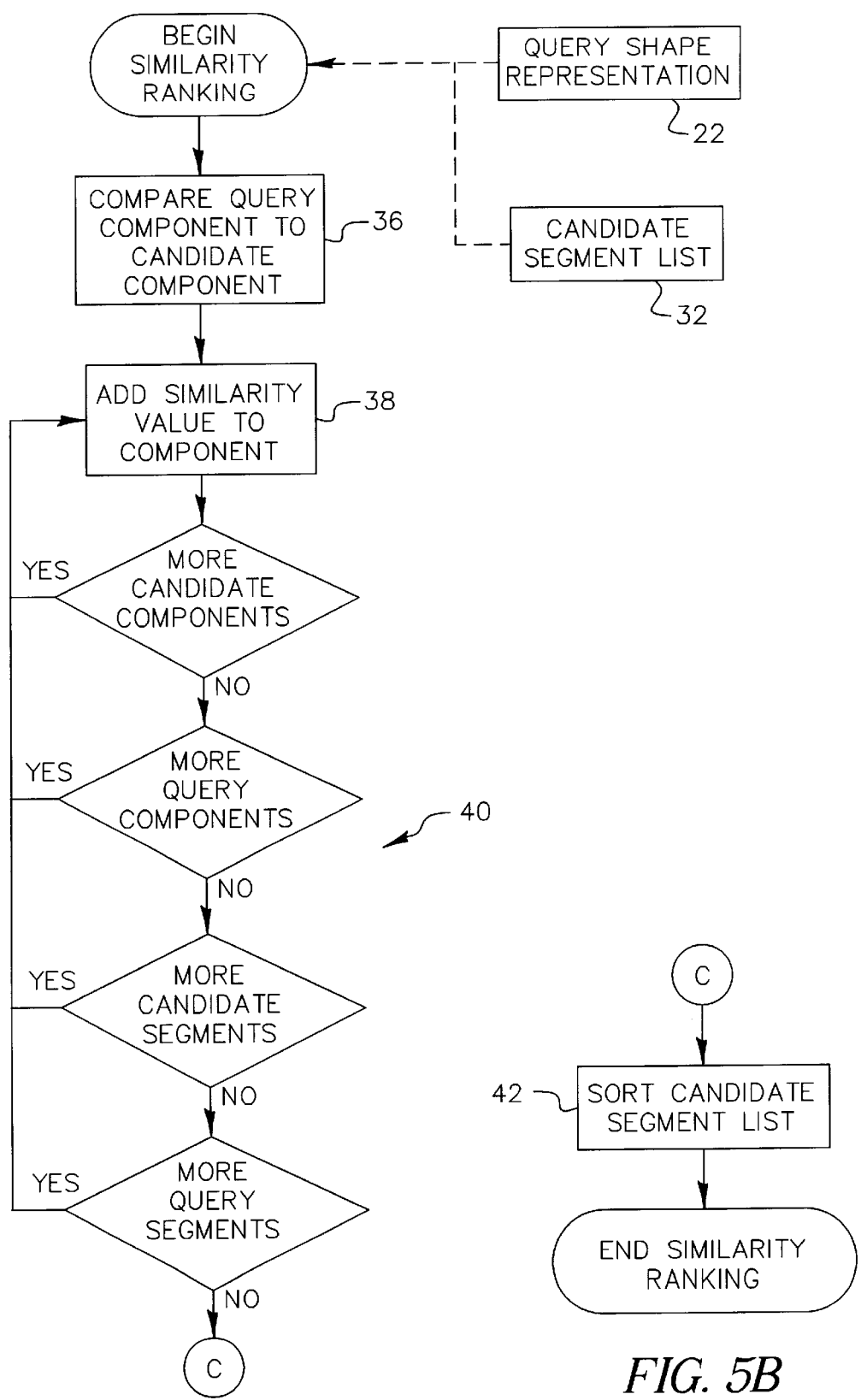
FIGS. 5A and 5B show a method for doing similarity ranking of search results obtained from the query of FIG. 4.

Referring now to FIGS. 5A and 5B, given a set of normalized Fourier Descriptors from two different boundaries, one being the query image segment's shape representation 22 (FIG. 1a) and the other being a candidate image segment's shape representation 32 (FIG. 4) retrieved by a search through the R-Tree index, the next step is to determine their similarity of the representations, and to obtain a similarity ranking of the candidate segments, as may be appropriate. More specifically, similarity is evaluated in a comparing stage 36 by comparing each query component to each candidate component. This matter requires the consideration of several items. First is the method by which to compare the descriptors. Second, one may choose between using just the magnitudes of the descriptors or also include the phase information in the comparison. Lastly, how many descriptors should be involved in the comparison? This decision is driven by two factors: computation efficiency and shape generalization. In the former case, the fewer descriptors used in the comparison calculation, the faster the comparison will be performed. In the latter case, using fewer descriptors, by not including the higher frequency components, tends to "generalize" the shape representation, as can be observed in FIG. 3. Generalizing too much will tend to make all shapes similar. Not generalizing enough only wastes time comparing higher frequency descriptors that add little to the overall measure. The first two items will be discussed further below.

The method chosen by which to compare the descriptors, $\alpha^b$ and $\alpha^c$, of two different boundaries, b and c, is the Euclidean distance metric. This metric is calculated on the difference between the two sets of descriptors, as follows:

$$d_E(a^b, a^c) = \sum_{n=-ND}^{ND} (a_n^b - a_n^c)^2 \quad (21)$$

where the comparison is over the range [−ND, ND], with ND=10. This uses all the information present in the descriptors, i.e., both the magnitude and phase. As noted above, the phase information is not perfectly normalized and, therefore, the similarity measure must compensate for this error. This compensation involves calculating the Euclidean distance without any phase compensation and for each of the seven phase compensations identified above. The final distance is taken as the minimum of the eight distances. One can easily show through the application of Parseval's formula that this is equivalent to the mean square error between the two boundaries in the space domain with an equal weighting on each point.

The measure is actually a distance, with exact equivalence having a distance of zero and any deviation being greater than zero. Similarity measures, on the other hand, typically assign a value of one to exact equivalence and values less that one to deviations from this case. Therefore, the Euclidean distance is subtracted from one in order to provide a measure of similarity. This similarity value is added to the component in the addition stage 38, and the further components and segments are examined for similarity following a set of queries 40 until the similarity values are obtained for all candidate components and segments. Then the candidate segment 32 may be sorted in a sorting stage 42 by similarity, and the similarity ranking is completed.

Figure 8:
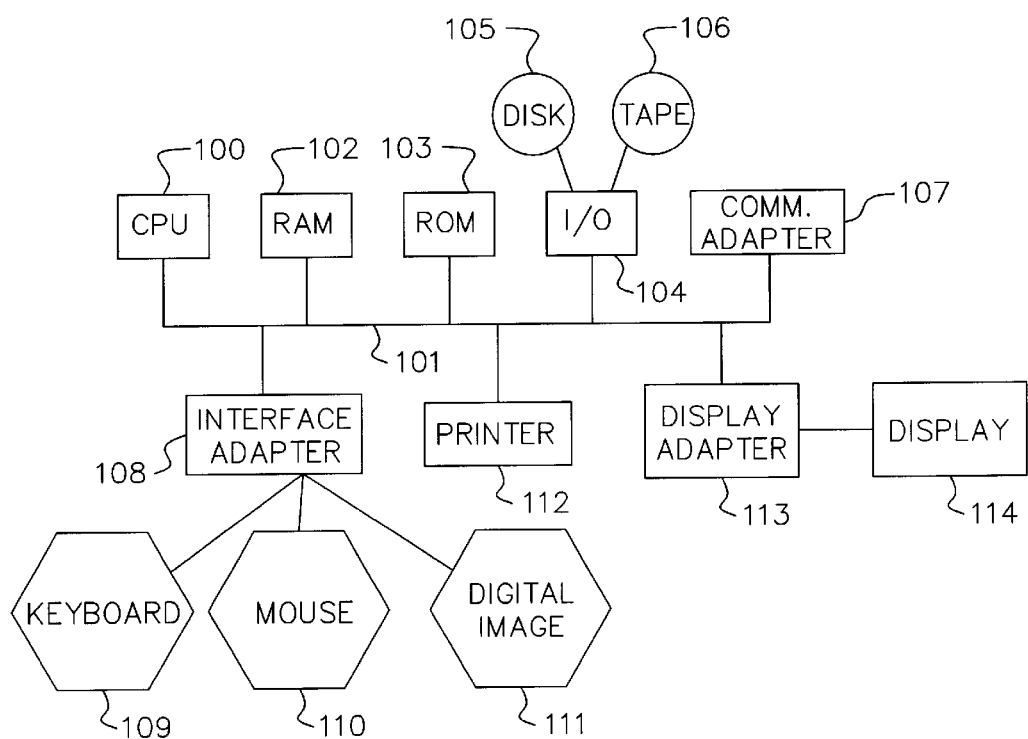
FIG. 8 is a block diagram of a computer system for implementing the present invention.

While the overall methodology of the invention is described above, the invention can be embodied in any number of different types of systems and executed in any number of different ways, as would be known by one ordinarily skilled in the art. For example, as illustrated in FIG. 8, a typical hardware configuration of an information handling/computer system in accordance with the invention preferably has at least one processor or central processing unit (CPU) 100. The CPU 100 is interconnected via a system bus 101 to a random access memory (RAM) 102, a read-only memory (ROM) 103, an input/output (I/O) adapter 104 (for connecting peripheral devices such as disk units 105 and tape drives 106 to the bus 101), a communication adapter 107 (for connecting the information handling system to a data processing network, such as the Internet), a user interface adapter 108 (for connecting peripherals 109, 110, 111 such as a keyboard, mouse, digital image input unit (e.g., a scanner), microphone speaker and/or other user interface device to the bus 101), a printer 112 and a display adapter 113 (for connecting the bus 101 to a display device 114).

The invention could be implemented using a structure such as shown in FIG. 8 by including the inventive method within a computer program stored on the storage device 105. Such a computer program would act on a query image supplied, e.g., through the interface adapter 108 or through the network connection 107. The system would then automatically provide a shape representation for the query image; this shape representation could then be used to search for similar images in a database resident, e.g., on the disk unit 105 or supplied through the network connection 107. The search results can, e.g., be viewed on the display 114, sent to the printer 112 or communicated back to the network 107.

The subject matter of the present invention relates to digital image understanding technology, which is understood to mean technology that digitally processes a digital image to recognize and thereby assign useful meaning to human understandable objects, attributes or conditions and then to utilize the results obtained in the further processing of the digital image.

The invention has been described with reference to a preferred embodiment. However, it will be appreciated that variations and modifications can be effected by a person of ordinary skill in the art without departing from the scope of the invention.

Parts List

10 segmentation stage
12 boundary representation stage
14 query
16 component identification stage
18 segment query
20 Fourier Descriptor representation stage
22 segment shape representation
24 index calculation stage
26 component and segment query stage
27 shape representation
28 searching stage
30 result adder stage
32 candidate segment list
34 query stage
36 comparing stage
38 addition stage
40 query
42 sorting stage
100 CPU
101 bus
102 RAM
103 ROM
104 I/O adapter
105 disk unit
106 tape drive
107 communication adapter
108 interface adapter
109 keyboard
110 mouse
111 digital image input unit
112 printer 113 display adapter
114 display device

What is claimed is:

1. A method for representing an image in terms of the shape properties of its identified segments of interest, said method comprising the steps of:
    (a) providing a digital image with identified segments of interest;
    (b) analyzing a segment of interest to identify one or more of its perceptually significant components, wherein perceptually insignificant components are removed from the segment of interest;
    (c) representing a perceptually significant component in terms of its shape properties, thereby providing a shape representation;
    (d) characterizing an image segment as a composition of the shape representations of its perceptually significant components, thereby providing a characterized image segment; and
    (e) repeating steps (b) to (d) to represent the image as a composition of its characterized segments;
    wherein step (b) includes removing perceptually insignificant components from the boundary model of the identified segments with a morphological filter.

2. The method as claimed in claim 1 wherein step (b) comprises the steps of extracting a boundary model of the identified segments and decomposing the boundary model into perceptually significant components.

3. The method as claimed in claim 1 wherein the morphological filter is adaptive to the roughness of the shape boundary.

4. The method as claimed in claim 1 wherein step (c) comprises representing the perceptually significant component in terms of Fourier Descriptors.

5. The method as claimed in claim 4 wherein the Fourier Descriptors are normalized so as to be insensitive at least to rigid transformations.

6. The method as claimed in claim 1 as used for determining the similarity of two image segments, said method further comprising the steps of:
    (a) providing first and second image segments;
    (b) applying steps (b) to (e) of claim 1 to both the first and second segments to generate the respective representations; and
    (c) computing the similarity between the first and second segments in terms of the similarity of their perceptually significant components.

7. The method as claimed in claim 6 wherein said computing the similarity between the first and second segments involves the comparison of a Euclidean distance metric for the respective representations.

8. A system representing an image in terms of the shape properties of its identified segments of interest, said system retrieving, from a database of image segments, images containing a segment similar to a query image segment, said system comprising:
    means for analyzing each segment of interest to automatically identify one or more of its perceptually significant components, wherein perceptually insignificant components are removed from each segment of interest;
    means for representing each perceptually significant component in terms of its shape properties, thereby providing a shape representation;
    means for characterizing each image segment as a composition of the shape representations of its perceptually significant components, thereby providing a characterized image segment; and
    means for representing the image as a composition of its characterized image segments;
    means for providing an example digital image with the identified segments of interest and a database of archived images and their segment representations;
    means for searching the database for candidate images that may contain segments with perceptually similar components to those of the example digital image;
    means for determining overall similarity between example digital image and candidate images by computing the similarity between the segment representations of the example digital image and the segment representation of the candidate images in terms of the similarity of their perceptually significant components; and
    means for retrieving and displaying the resulting candidate images.

9. A method for retrieving, from a database of image segments, images containing a segment similar to a query image segment, said method further comprising the steps of:
    providing an example digital image with the identified segments of interest;
    providing a database of archived images and their segment representations;
    analyzing a segment of interest to identify one or more of its perceptually significant components, wherein perceptually insignificant components are removed from the segment of interest;
    representing a perceptually significant component in terms of its shape properties, thereby providing a shape representation;
    characterizing an image segment as a composition of the shape representations of its perceptually significant components, thereby providing a characterized image segment; and
    repeating said analyzing, representing, and characterizing steps to represent the image as a composition of its characterized segments;
    searching the database for candidate images that may contain segments with perceptually similar components to those of the example digital image;
    determining overall similarity between example digital image and candidate images by computing the similarity between the segment representations of the example digital image and the segment representation of the candidate images in terms of the similarity of their perceptually significant components; and
    retrieving and displaying the resulting candidate images.

10. The method as claimed in claim 9 further comprising the step of ranking the similarity and wherein said retrieving and displaying rank orders the resulting candidate images.

11. The method as claimed in claim 9 wherein said step of providing a database includes providing a multi-dimensional index to the archived images and wherein said characterized segments of said digital image are limited in dimensionality to correspond to the index.

12. A method for representing an image in terms of the shape properties of its identified segments of interest, said method comprising the steps of:
    (a) extracting a boundary model of an identified segment of interest;
    (b) decomposing the boundary model of the segment of interest into relevant components;

(c) morphologically filtering the relevant components to remove perceptually insignificant components of the segment of interest, thereby identifying one or more of its perceptually significant components;

(d) representing a perceptually significant component in terms of its shape properties, thereby providing a shape representation;

(e) characterizing an image segment as a composition of the shape representations of its perceptually significant components, thereby providing a characterized image segment; and (f) repeating steps (b) to (e) to represent the image as a composition of its characterized segments.

13. The method as claimed in claim 12 wherein the filtering of step (c) is adaptive to the roughness of the shape boundary.

14. The method as claimed in claim 12 wherein step (d) comprises representing the perceptually significant component in terms of Fourier Descriptors.

15. The method as claimed in claim 14 wherein the Fourier Descriptors are normalized so as to be insensitive at least to rigid transformations.

16. A computer program product for representing an image in terms of the shape properties of its identified segments of interest comprising: a computer readable storage medium having a computer program stored thereon for performing the steps of:

(a) providing a digital image with the identified segments of interest;

(b) analyzing a segment of interest to automatically identify one or more of its perceptually significant components, wherein perceptually insignificant components are removed from the segment of interest;

(c) representing a perceptually significant component in terms of its shape properties, thereby providing a shape representation;

(d) characterizing an image segment as a composition of the shape representations of its perceptually significant components, thereby providing a characterized image segment; and (e) repeating steps (b) to (d) to represent the image as a composition of its characterized segments;

wherein step (b) includes removing perceptually insignificant components from the boundary model of the identified segments with a morphological filter.

17. The computer program product as claimed in claim 16 as used for determining the similarity of two image segments, said computer program product further comprising the steps of:

(a) providing first and second image segments;

(b) applying steps (b) to (e) of claim 16 to both the first and second segments to generate the respective representations; and (c) computing the similarity between the first and second segments in terms of the similarity of their perceptually significant components.

18. A computer program product for retrieving, from a database of image segments, images containing a segment similar to a query image segment, comprising: a computer readable storage medium having a computer program stored thereon for performing the steps of:

providing an example digital image with the identified segments of interest;

providing a database of archived images and their segment representations;

analyzing a segment of interest to identify one or more of its perceptually significant components, wherein perceptually insignificant components are removed from the segment of interest;

representing a perceptually significant component in terms of its shape properties, thereby providing a shape representation;

characterizing an image segment as a composition of the shape representations of its perceptually significant components, thereby providing a characterized image segment; and repeating said analyzing, representing, and characterizing steps to represent the image as a composition of its characterized segments;

searching the database for candidate images that may contain segments with perceptually similar components to those of the example digital image;

determining overall similarity between example digital image and candidate images by computing the similarity between the segment representations of the example digital image and the segment representation of the candidate images in terms of the similarity of their perceptually significant components; and retrieving and displaying the resulting candidate images.

19. A system representing an image in terms of the shape properties of its identified segments of interest, said system comprising:

means for analyzing each segment of interest to automatically identify one or more of its perceptually significant components, wherein perceptually insignificant components are removed from each segment of interest;

means for representing each perceptually significant component in terms of its shape properties, thereby providing a shape representation;

means for characterizing each image segment as a composition of the shape representations of its perceptually significant components, thereby providing a characterized image segment; and means for representing the image as a composition of its characterized image segments;

wherein said means for analyzing includes means for removing perceptually insignificant components from the boundary model of the identified segments with a morphological filter.

20. A system for determining the similarity of two image segments that are represented according to claim 19 in terms of the shape representations of their identified segments of interest, said system comprising:

means for obtaining first and second image segments; and means for computing the similarity between the first and second segments in terms of the similarity of their perceptually significant components.

* * * * *